(12) United States Patent
Cho (10) Patent No.: US 12,347,473 B2
(45) Date of Patent: Jul. 1, 2025

(54) DIELECTRIC REPRODUCING DEVICE AND DIELECTRIC RECORDING AND REPRODUCING DEVICE

(71) Applicant: TOHOKU UNIVERSITY, Sendai (JP)

(72) Inventor: Yasuo Cho, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 0 days.

(21) Appl. No.: 18/839,178

(22) PCT Filed: Mar. 13, 2023

(86) PCT No.: PCT/JP2023/009496
§ 371 (c)(1),
(2) Date: Aug. 16, 2024

(87) PCT Pub. No.: WO2023/189452
PCT Pub. Date: Oct. 5, 2023

(65) Prior Publication Data
US 2025/0166660 A1    May 22, 2025

(30) Foreign Application Priority Data

Mar. 30, 2022  (JP) ................................. 2022-057716
Dec. 23, 2022  (WO) .................. PCT/JP2022/047554

(51) Int. Cl.
*G11B 9/02*     (2006.01)
*G11B 9/14*     (2006.01)

(52) U.S. Cl.
CPC .............. *G11B 9/02* (2013.01); *G11B 9/1409* (2013.01)

(58) Field of Classification Search
CPC ................................. G11B 9/02; G11B 9/1409
See application file for complete search history.

(56) References Cited

U.S. PATENT DOCUMENTS

2010/0231239 A1* 9/2010 Tateishi ................... G11B 9/06
                                                            324/672
2011/0242961 A1* 10/2011 Umezawa ................ G11B 9/02
                                                            204/192.15
2017/0099055 A1* 4/2017 Maksymovych ...... B82Y 25/00

FOREIGN PATENT DOCUMENTS

JP    H05-182261 A    7/1993
JP    2001-344836 A   12/2001
JP    2002-133602 A    5/2002

(Continued)

OTHER PUBLICATIONS

Kikitsu et al., "A concept of exchange-coupled recording medium for heat-assisted magnetic recording," Journal of Applied Physics, 2005, vol. 97, 10P701.

(Continued)

*Primary Examiner* — Andrew Sasinowski
(74) *Attorney, Agent, or Firm* — Oliff PLC (57) ABSTRACT

A dielectric reproducing device and a dielectric recording and reproducing device that can improve the reproduction speed. A detection means is provided so as to be able to detect a polarization state of each bit 1a corresponding to the data recorded in a data recording layer by relatively scanning the data recording layer made of a dielectric material. A heating means is provided so as to be able to heat the bit to be detected to a predetermined temperature while the detection means detects the polarization state. A reproducing means is provided so as to be able to reproduce the data based on the polarization state of each bit detected by the detection means.

20 Claims, 7 Drawing Sheets

(56) References Cited

FOREIGN PATENT DOCUMENTS

| JP | 2004-127489 A | 4/2004 |
|----|---------------|--------|
| JP | 2006-268894 A | 10/2006 |
| JP | 2010-020879 A | 1/2010 |

OTHER PUBLICATIONS

Matsumoto et al., Thermally Assisted Magnetic Recording, Fujitsu, Jan. 2007, vol. 58, No. 1, pp. 85-89.

Yoshizawa et al., "Simulation Technology for Thermally-Assisted Magnetic Recording Media", Fuji Times, 2009, vol. 82, No. 3, pp. 170-173.

Matsumoto et al., "Highly efficient probe with a wedge-shaped metallic plate for high density near-field optical recording," Journal of Applied Physics, Apr. 15, 2004, vol. 95, No. 8, pp. 3901-3906.

Matsumoto et al., "Thermally assisted magnetic recording on a bit-patterned medium by using a near-field optical head with a beaked metallic plate," Applied Physics Letters, 2008, vol. 93, 031108.

Challener et al., "Hear-assisted magnetic recording by a near-field transducer with efficient optical energy transfer," Nature Photonics, Apr. 2009, vol. 3, pp. 220-224.

Stipe et al., "Magnetic recording at 1.5 Pbm-2 using an integrated plasmonic antenna," Nature Photonics, Jul. 2010, vol. 4, pp. 484-488.

Matsumoto et al., "Integrated head design using a nanobeak antenna for thermally assisted magnetic recording," Optics Express, Aug. 13, 2012, vol. 20, No. 17, pp. 18946-18954.

Matsumoto, Takuya, "Optical Near-Field Technology for Heat Assisted Magnetic Recording," Optics, 2013, vol. 42, No. 1, pp. 26-31.

Cho, Yasuo, "Scanning Nonlinear Dielectric Microscopy", Applied Physics, 1998, vol. 67, No. 3, pp. 327-331.

Tanaka et al., "Scanning Nonlinear Dielectric Microscopy Nano-Science and Technology for Next Generation High Density Ferroelectric Data Storage," Japanese Journal of Applied Physics, 2008, vol. 4 7, No. 5, pp. 3311-3325.

Tanaka et al., "Actual information storage with a recording density of 4 Tbit/in.2 in a ferroelectric recording medium," Applied Physics Letters, 2010, vol. 97, 092901.

Hiranaga et al., "Nanodomain Formation on Ferroelectrics and Development of Hard-Disk-Drive-Type Ferroelectric Data Storage Devices," Japanese Journal of Applied Physics, 2009, vol. 48, 09KA18.

Hiranaga et al., "Material Design Strategy for Enhancement of Readback Signal Intensity in Ferroelectric Probe Data Storage," IEEE Transactions on Ultrasonics, Ferroelectrics, and Frequency Control, Mar. 2021, vol. 68, No. 3, pp. 859-864.

Odagawa et al., Long-term-retention characteristics of small inverted dots formed on congruent "Single-crystal LiTaO3," Applied Physics Letters, 2006, vol. 89, 102906.

May 16, 2023 International Search Report issued in International Patent Application No. PCT/JP2023/009496.

May 16, 2023 Written Opinion of the International Searching Authority issued in International Patent Application No. PCT/JP2023/009496.

* cited by examiner

DIELECTRIC REPRODUCING DEVICE AND DIELECTRIC RECORDING AND REPRODUCING DEVICE

FIELD OF THE INVENTION

The present invention relates to a dielectric reproducing device and a dielectric recording and reproducing device.

DESCRIPTION OF RELATED ART

Hard disk drives using magnetic recording media have been widely used as high-density, large-capacity, and randomly accessible information recording and reproducing devices. Hard disk drives are used in servers, personal computers, hard disk recorders, and the like, and there is a demand for improved recording density in order to further increase capacity. However, when the recording density approaches 1 Tb/inch², there is a problem that the recorded information is disturbed by thermal disturbance of magnetic media.

Therefore, in order to realize high-density recording beyond this limit, a heat-assisted magnetic recording (HAMR) device has been developed (see, for example, Patent Literature 1 and Non-Patent Literatures 1 to 3). A heat-assisted magnetic recording device is configured to record information in a recording portion of a magnetic medium by applying a magnetic field while heating the recording portion of the magnetic medium with a laser beam at the moment when information is recorded on the magnetic medium. In addition, in heat-assisted magnetic recording devices, since the recording density is determined by the size of the light spot of the laser beam, devices that use near-field light to generate minute light spots of several tens of nm or less have been developed to achieve a high recording density of 1 Tb/inch² or more (see, for example, Non-Patent Literatures 4 to 9).

However, in magnetic recording devices using magnetic media, it is impossible to avoid the constraints imposed by physical principles, namely that reducing the bit size impairs the thermal stability of the recording bit due to exchange interactions. Thus, even with heat-assisted magnetic recording, there is a limit in achieving high-density magnetic recording. Therefore, the present inventors have proposed a dielectric recording and reproducing device using a dielectric material, which does not have exchange interaction and is expected to achieve higher density than magnetic recording (see, for example, Patent Literature 2 or Non-Patent Literature 10). The dielectric recording and reproducing device can record and reproduce information in a dielectric material using the technology of SNDM (Scanning Nonlinear Dielectric Microscopy). The dielectric recording and reproducing device includes, for example, a metal probe for recording data in the dielectric material, a recording signal generating means for generating a recording signal corresponding to the data, an application means for applying a recording signal between the probe and an electrode provided on a back surface of a recording layer made of a dielectric material, an AC signal generating means for generating an AC voltage signal, a voltage application means for applying the AC voltage signal between the probe and an electrode provided on the back surface of the recording layer during reproduction, an oscillation means for oscillating according to the recorded polarization state of the dielectric material, a demodulation means for demodulating the oscillation signal generated by the oscillation means, and a data reproduction means for reproducing data based on the phase information of the signal demodulated by the demodulation means.

In order to realize a high-density dielectric recording and reproducing device, the present inventors have conducted basic research for recording information in a dielectric material and have succeeded in forming domain dots with a diameter of 2.8 nm on the surface of a dielectric material ($LiTaO_3$ single crystal) capable of recording information (see, for example, Non-Patent Literature 11). This corresponds to a recording density of 80 Tb/inch², and it is expected that data recording density will increase. It has also been confirmed that nano-domain dots can be formed (polarization inversion) on the surface of a dielectric material ($LiTaO_3$ single crystal) using a pulse with a pulse width of 0.5 nsec (see, for example, Non-Patent Literature 11). This corresponds to a writing speed of 2 Gbps, and high recording speeds can be expected.

Based on these results, the present inventors actually fabricated a prototype dielectric recording and reproducing device and performed an experiment to record 64×64 bits of actual data on a dielectric material ($LiTaO_3$ single crystal) using an SNDM technology. As a result, the bit interval of the recorded data was 12.8 nm, and a recording density of approximately 4 Tb/inch² was obtained (see, for example, Non-Patent Literature 12). In addition, a prototype hard disk drive-type dielectric recording and reproducing device was fabricated, and a recording (writing) and reproducing (reading) experiment was performed on the surface of a disk-shaped dielectric material ($LiTaO_3$ single crystal). As a result, the bit interval of the recorded data was 13.7 nm, and a recording density of approximately 3.4 Tb/inch² was obtained. On the other hand, the reproduction speed was 2 Mbps, and the S/N ratio of the reproduced signal to noise was 8.96 dB (see, for example, Non-Patent Literature 13).

The present inventors have found that when the temperature of a ferroelectric is increased, the nonlinear dielectric constant ($\varepsilon_{333}$) increases rapidly as the temperature approaches the Curie point. Therefore, in order to further improve the reproduction speed, they are developing a ferroelectric material with a large nonlinear dielectric constant ($\varepsilon_{333}$) by controlling the Curie point, with the aim to produce a recording medium that can obtain a large reproduced signal that is not buried in noise even during high-speed reproduction (see, for example, Non-Patent Literature 14).

The present inventors also found an empirical formula showing the relationship between the reduction rate of the domain dot diameter, temperature, and heating time from the fact that domain dots shrink when a dielectric material of $LiTaO_3$ single crystal with domain dots formed on the surface is heat-treated. As a result, it was found that the life of a $LiTaO_3$ single crystal with a thickness of 80 nm (the time taken for the domain dot diameter to shrink from 50 nm to 40 nm) is more than 16 years at 80° C., which is sufficiently practical (see, for example, Non-Patent Literature 15).

CITATION LIST

Patent Literatures

Patent Literature 1: JP 2002-133602 A
Patent Literature 2: JP 2004-127489 A

Non-Patent Literatures

Non-Patent Literature 1: Akira Kikitsu, et al., "A concept of exchange-coupled recording medium for heat-assisted magnetic recording", J. Appl. Phys., 2005, 97, 10P701

Non-Patent Literature 2: Koji Matsumoto, Takuya Uemura, Satoshi Shimokawa, "Heat-assisted magnetic recording", FUJITSU, 2007 01, 58, 1, pp. 85-89

Non-Patent Literature 3: Takeshi Yuzawa, Nobuyuki Takahashi, "Simulation technology for heat-assisted magnetic recording media", Fuji Times, 2009, Vol. 82, No. 3, pp. 170-173

Non-Patent Literature 4: T. Matsumoto, et al., "Highly efficient probe with a wedge-shaped metallic plate for high density near-field optical recording", 2004, J. Appl. Phys., 2004, 95, pp. 3901-3906

Non-Patent Literature 5: T. Matsumoto, et al., "Heat-assisted magnetic recording on a bit-patterned medium by using a near-field optical head with a beaked metallic plate", Appl. Phys. Lett., 2008, 93, 031108

Non-Patent Literature 6: W. A. Challener, et al., "Hear-assisted magnetic recording by a near-field transducer with efficient optical energy transfer", Nature Photonics, April 2009, Vol. 3, p.220-224

Non-Patent Literature 7: Barry C. Stipe, et al., "Magnetic recording at 1.5 Pbm-2 using an integrated plasmonic antenna", Nature Photonics, July 2010, Vol. 4, p.484-488

Non-Patent Literature 8: T. Matsumoto, et al., "Integrated head design using a nanobeak antenna for heat-assisted magnetic recording", Optics Express, 13 Aug. 2012, Vol. 20, No. 17, p.18946-18954

Non-Patent Literature 9: Takuya Matsumoto, "Application of Near-Field Light to Heat-assisted magnetic recording", Optics, 2013, 42, No. 1, pp. 26-31

Non-Patent Literature 10: Yasuo Naga, "Scanning Nonlinear Dielectric Microscopy", Applied Physics, 1998, Vol. 67, No. 3, pp. 327-331

Non-Patent Literature 11: K. Tanaka, et al., "Scanning Nonlinear Dielectric Microscopy Nano-Science and Technology for Next Generation High Density Ferroelectric Data Storage", Jpn. J. Appl. Phys., 2008, Vol. 47, No. 5, pp. 3311-3325

Non-Patent Literature 12: K. Tanaka and Y. Cho, "Actual information storage with a recording density of 4 Tbit/in.2 in a ferroelectric recording medium", Appl. Phys. Lett., 2010, 97, 092901

Non-Patent Literature 13: Y. Hiranaga, T. Uda, Y. Kurihashi, H. Tochishita, M. Kadota and Y. Cho, "Nanodomain Formation on Ferroelectrics and Development of Hard-Disk-Drive-Type Ferroelectric Data Storage Devices", Jpn. J. Appl. Phys., 2009, Vol. 48, 09KA18

Non-Patent Literature 14: Y. Hiranaga and Y. Cho, "Material Design Strategy for Enhancement of Readback Signal Intensity in Ferroelectric Probe Data Storage", IEEE TRANSACTIONS ON ULTRASONICS, FERROELECTRICS, AND FREQUENCY CONTROL, March 2021, Vol. 68, No. 3, p.859-864

Non-Patent Literature 15: Nozomi Odagawa and Yasuo Cho, "Long-term-retention characteristics of small inverted dots formed on congruent "Single-crystal $LiTaO_3$", Applied Physics Letters, 2006, 89, 102906

SUMMARY OF THE INVENTION

The dielectric recording and reproducing devices described in Patent Literature 2 and Non-Patent Literatures 10 to 13 are expected to achieve higher density data recording than magnetic recording devices using magnetic media. However, the reproduction speed of recorded data is on the order of Mbps, and there is a problem that the reproduction speed needs to be improved in order to put it into practical use. The present invention has been made with a focus on such problems, and aims to provide a dielectric reproducing device and a dielectric recording and reproducing device that can improve the reproduction speed.

Means for Solving the Problems

Based on the knowledge that when the temperature of a ferroelectric material is increased, the nonlinear dielectric constant increases rapidly as the temperature approaches the Curie point, the present inventor has previously attempted to develop ferroelectric materials with large nonlinear dielectric constants by controlling the Curie point in order to further improve the reproduction speed. However, rather than developing such a new material, the present inventor has come up with the idea that the nonlinear dielectric constant can be increased by bringing the temperature of an existing ferroelectric material closer to the Curie point, and has arrived at the present invention.

That is, in order to achieve the above object, the dielectric reproducing device according to the present invention is a dielectric reproducing device for reproducing data recorded on a data recording layer made of a dielectric material, the data recording layer being capable of recording data based on a polarization state of each bit formed on the dielectric material, the dielectric reproducing device including: a detection means provided to be able to detect a nonlinear dielectric constant due to the polarization state of each bit corresponding to the data by relatively scanning the data recording layer; a heating means provided to be able to heat the bit to be detected to a predetermined temperature while the detection means detects the nonlinear dielectric constant due to the polarization state; and a reproducing means provided to be able to reproduce the data based on the nonlinear dielectric constant due to the polarization state of each bit detected by the detection means.

In the dielectric reproducing device according to the present invention, the temperature of the detected bit can be raised by the heating means when the detection means relatively scans the data recording layer to detect the polarization state of each bit formed on the data recording layer made of a dielectric material. In this way, the nonlinear dielectric constant of each bit increases, making it possible to detect a reproduced signal with a high S/N ratio. When the S/N ratio of the reproduction signal is increased, since the reproduction signal can be detected even if the relative scanning speed of the detection means is increased, the reproduction speed of the data recorded on the data recording layer can be improved.

In the dielectric reproduction device according to the present invention, the dielectric material may be any material that can be polarized for each individual bit, and is particularly preferably made of a ferroelectric material such as $LiTaO_3$ crystal, for example, CLT or SLT. In addition, in the dielectric reproduction device according to the present invention, it is sufficient that the detection means is provided to relatively scan the data recording layer, and during scanning, the data recording layer may be fixed and the detection means may move, the detection means may be fixed and the data recording layer may move, or the detection means and the data recording layer may move together.

In the dielectric reproduction device according to the present invention, the reproduction speed can be improved as the nonlinear dielectric constant of the bit to be detected by the detection means is increased, so that the temperature of the bit should be lower than the Curie point of the dielectric material forming the data recording layer and the closer to the Curie point, the better. For this reason, it is preferable that the temperature of each bit heated by the heating means is as close as possible to the Curie point of the dielectric material forming the data recording layer. Since the Curie point varies depending on the dielectric material, it is preferable to set the heating temperature by the heating means according to the type of dielectric material forming the data recording layer. For example, the Curie point is 601° C. for CLT and 685° C. for SLT.

In the dielectric reproducing device according to the present invention, since the data recording layer is made of a dielectric material, the retention characteristics of each bit deteriorate due to heating. Therefore, in order to prevent deterioration of the thermal stability of the data recording layer, it is preferable that the heating means is capable of heating only the bit to be detected to a predetermined temperature only while the detection means detects the polarization state. However, not only the bit to be detected but also the surrounding bits may be heated only for the short time during which the detection means detects the polarization state. It is preferable that the heating means is configured to heat the bit to be detected in synchronization with the timing at which the detection means detects the polarization state of the bit.

Furthermore, in the dielectric reproducing device according to the present invention, the heating means may heat the bit to be detected in any configuration. For example, the heating means may have an emission means for emitting a laser beam and a lens for focusing the laser beam emitted from the emission means, and is configured to heat the bit to be detected by irradiation with the laser beam focused by the lens. In this case, the temperature of not only the bit to be detected but also the surrounding bits may increase, but the thermal stability of those bits is rarely affected if it is only for a short time to detect the polarization state. Therefore, the heating means can be configured with a simpler structure and at a lower cost than those that heat only the bit to be detected.

The detection means may have a probe that is provided so as to be able to relatively scan the data recording layer, and may be configured to detect the polarization state of the bit when a tip of the probe moves relatively to a position facing the bit to be detected, and the heating means may be capable of generating near-field light, be provided near the probe so as to be movable together with the probe, and be configured to be able to heat the bit to be detected by the near-field light. The detection means may have a metal probe, and the heating means may be configured to generate near-field light by irradiating the tip of the probe with a laser beam, and to be able to heat the bit to be detected by the near-field light. In these cases, the near-field light can generate a minute light spot of several tens of nm or less, so that even if the data bits are minute bits recorded at high density on the data recording layer, the temperature can be increased for each bit to detect a reproduction signal with a high S/N ratio. In addition, by using the near-field light, the bit to be detected can be heated instantaneously. Therefore, the bit to be detected is heated only while the detection means detects the polarization state, and the temperature of the bit can be decreased to the temperature before heating at the moment the detection is completed, thereby further improving the effect of preventing a decrease in thermal stability. The data recorded at high density on the data recording layer may be recorded by any method, for example, by a voltage pulse applied between the probe and the lower electrode of the data recording layer, or by other high-density recording means.

In the dielectric reproducing device according to the present invention, the heating means is preferably capable of relatively scanning the data recording layer and heating the bit to be detected by the detection means to a predetermined temperature. In this case, the heating means may heat each bit of the data recording layer intermittently in sequence in accordance with the timing of detection by the detection means, or may heat each bit in sequence by continuously heating the data recording layer while relatively scanning the data recording layer. For this reason, the heating means may use pulsed light or continuous light when heating using light such as a laser beam or near-field light.

In the dielectric reproducing device according to the present invention, the data recording layer is preferably opaque to a laser beam or near-field light so that it is heated by absorbing the laser beam or near-field light. However, if the data recording layer is transparent to a laser beam or near-field light, it is not possible to absorb these beams, so it is preferable that a light absorbing layer is provided on the side of the data recording layer opposite to the side scanned relatively by the detection means. Alternatively, when each bit is heated by a laser beam, the laser beam preferably has a wavelength shorter than the absorption edge of the dielectric material, and when each bit is heated by a near-field beam, the near-field beam preferably has a wavelength shorter than the absorption edge of the dielectric material. As a result, even without a light absorption layer, the data recording layer can efficiently absorb the laser beam or near-field beam for heating.

The dielectric recording and reproducing device according to the present invention has the dielectric reproducing device according to the present invention and a recording means configured to record data on the data recording layer, and the dielectric reproducing device is capable of reproducing the data recorded by the recording means.

The dielectric recording and reproducing device according to the present invention has the dielectric reproducing device according to the present invention, and therefore can improve the reproduction speed of data recorded on the data recording layer. The recording means is preferably capable of recording data on the data recording layer at a high density of, for example, 1 Tb/inch$^2$ or more.

According to the present invention, a dielectric reproducing device and a dielectric recording and reproducing device capable of improving the reproduction speed can be provided.

DETAILED DESCRIPTION OF THE INVENTION

Hereinafter, the embodiment of the present invention will be described based on the drawings.

FIGS. 1 to 9 show a dielectric reproducing device of an embodiment of the present invention.

Figure 1:
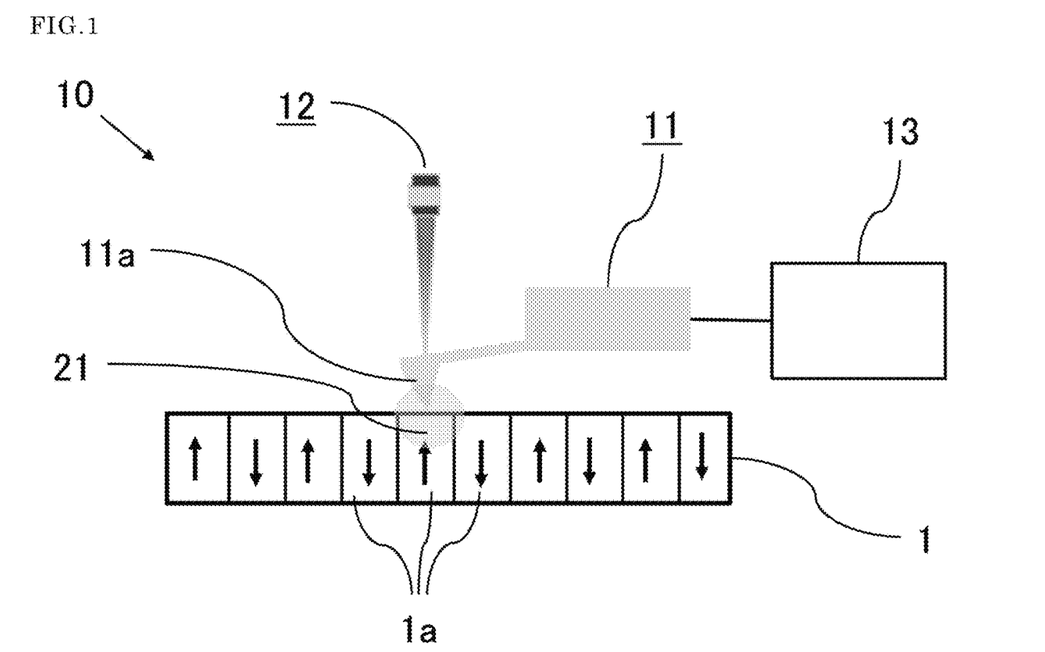
FIG. 1 is a schematic side view showing a dielectric reproducing device according to an embodiment of the present invention in use.

As shown in FIG. 1, a dielectric reproducing device 10 is a dielectric reproducing device for reproducing data recorded in a data recording layer 1 made of a dielectric material, and has a detection means 11, a heating means 12, a reproducing means 13, and an AC voltage application means (not shown).

The data recording layer 1 is provided so that data can be recorded depending on the polarization state of each bit 1a formed in the dielectric material. Specifically, the data recording layer 1 is capable of recording data depending on whether the polarization direction of each bit 1a of the dielectric material is positive or negative. The dielectric material may be any material that can be polarized for each individual bit 1a, and is, for example, made of a ferroelectric material such as $LiTaO_3$ crystal, such as CLT or SLT.

Figure 2:
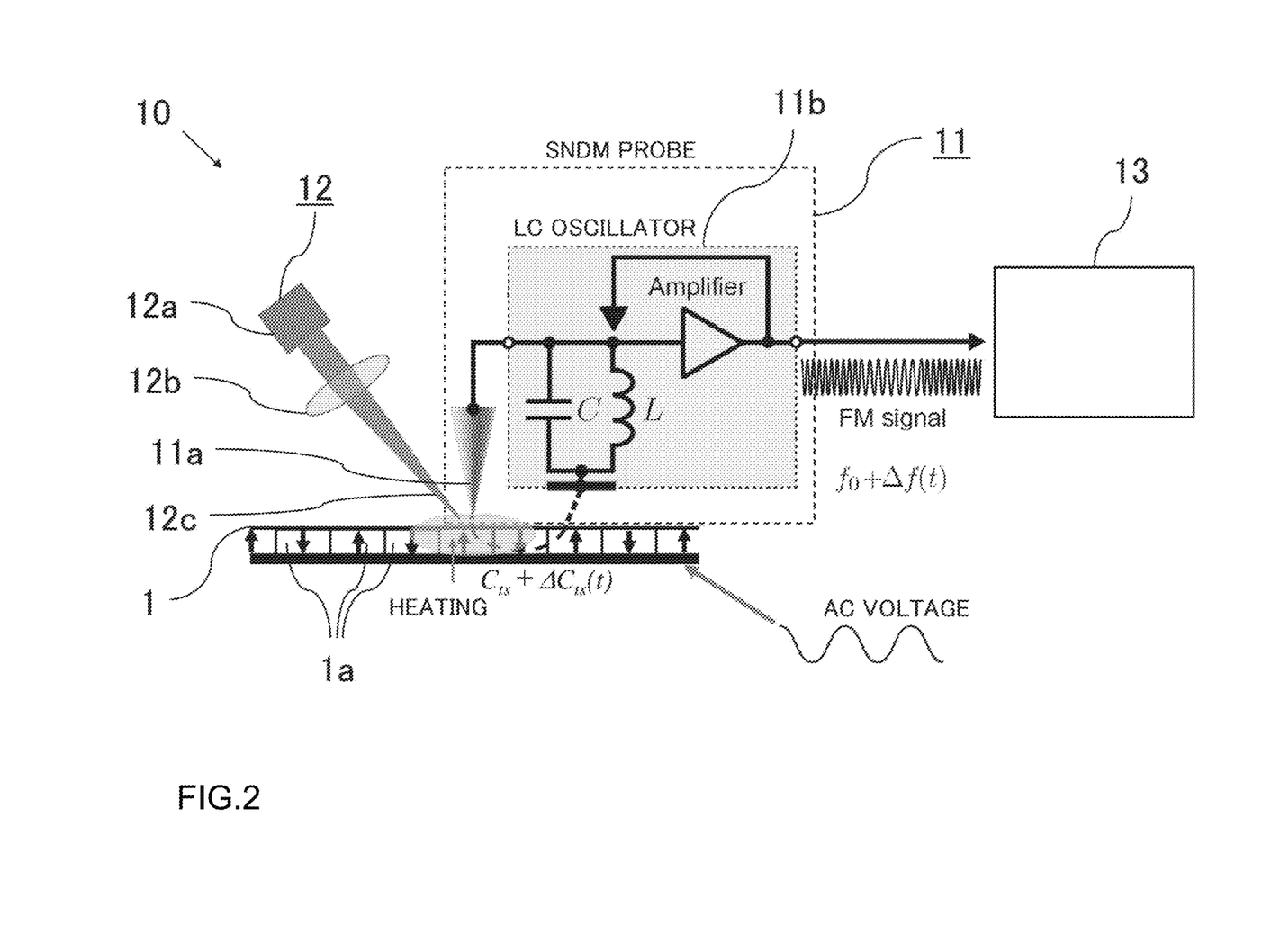
FIG. 2 is a side view showing a specific configuration of a dielectric reproducing device according to an embodiment of the present invention.

As shown in FIG. 2, the detection means 11 has a probe 11a that is provided so as to be capable of relatively scanning the data recording layer 1 on which data is recorded, and an oscillation means 11b that oscillates according to the polarization state of the bit 1a to be detected of the data recording layer 1. In a specific example shown in FIG. 2, the probe 11a and the oscillation means 11b are made of an SNDM probe, and the oscillation means 11b is made of an LC oscillator.

The detection means 11 is configured to detect the polarization state of the bit 1a when the tip of the probe 11a moves relatively to a position facing the bit 1a to be detected. Specifically, the sign of the nonlinear dielectric constant of the odd-rank tensor of the dielectric material changes depending on whether the polarization direction of the dielectric material is positive or negative. When an electric field is applied to this dielectric material, the sign of the change in capacitance of the dielectric material changes according to the positive or negative polarization due to nonlinearity. Therefore, the detection means 11 generates a frequency-modulated signal from the capacitance of each bit 1a of the data recording layer 1 by the oscillation means 11b in a state where a known AC voltage is applied to the data recording layer 1 by the AC voltage application means, outputs the signal as an oscillation signal, and detects the polarization direction of each bit 1a by comparing the frequency change with the phase of the applied AC voltage.

As shown in FIG. 2, the heating means 12 has an emission means 12a that emits a laser beam and a lens 12b that focuses the laser beam emitted from the emission means. The emission means is made of a laser diode. The heating means 12 is configured such that the tip of the probe 11a moves relatively to a position facing the bit 1a to be detected, and in synchronization with the timing at which the detection means 11 detects the polarization state of the bit 1a, the heating means 12 irradiates the bit 1a with the laser beam 12c focused by the lens 12b to heat the bit 1a to a predetermined temperature only while the detection means 11 detects the polarization state of the bit 1a.

Figure 3:
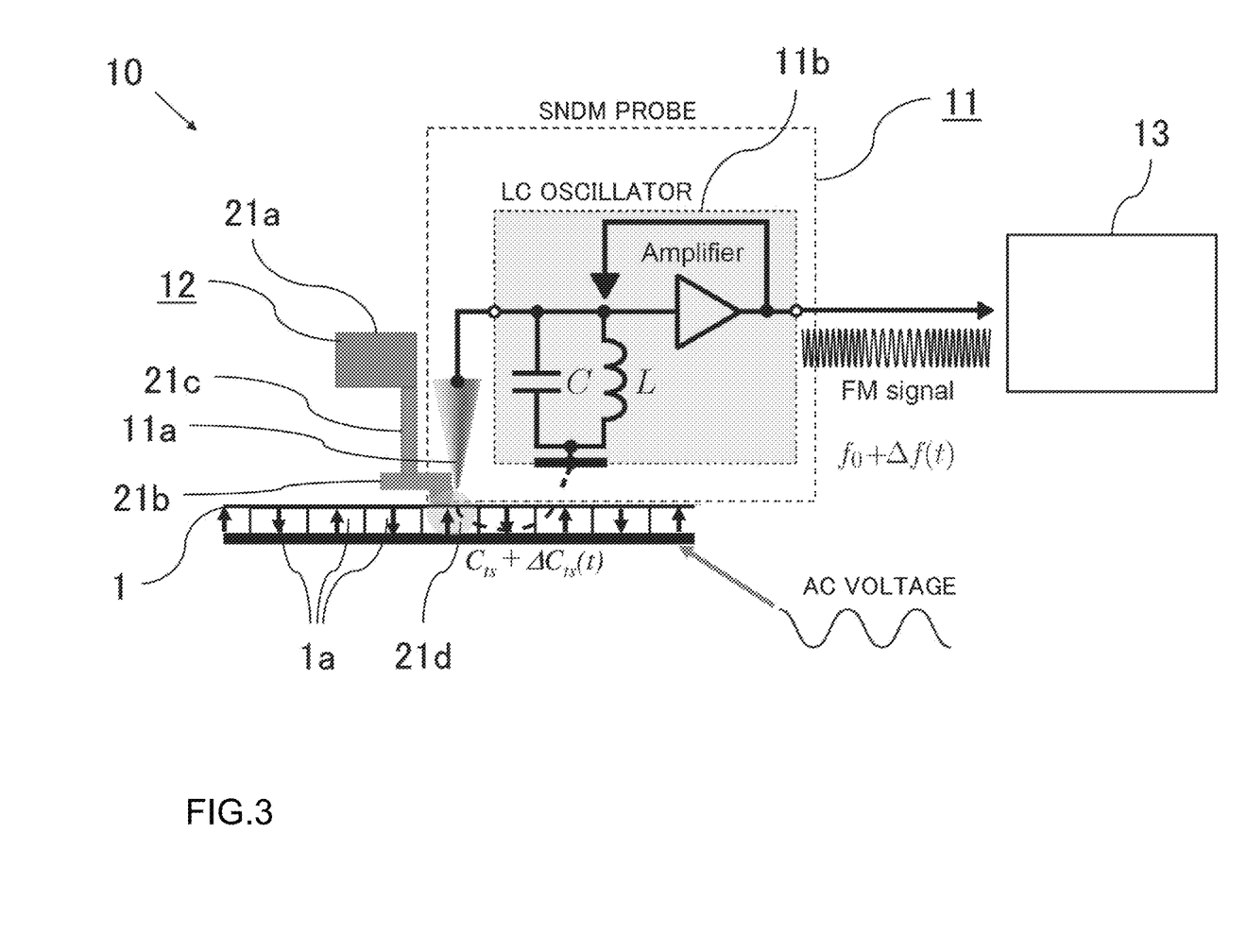
FIG. 3 is a side view showing a specific configuration of a first modified example of a dielectric reproducing device according to an embodiment of the present invention that uses near-field light.

As shown in FIG. 3, the heating means 12 may have a laser diode 21a, a near-field light generating device 21b provided so as to be capable of generating near-field light 21d by the laser beam from the laser diode 21a, and an optical waveguide 21c that guides the laser beam from the laser diode 21a to the near-field light generating device 21b. In this case, it is preferable that the heating means 12 is provided so that the near-field light generating device 21b is disposed near the tip of the probe 11a and is movable together with the probe 11a. This allows the heating means 12 to generate the near-field light 21d in the immediate vicinity of the tip of the probe 11a. In addition, the heating means 12 is preferably configured such that the tip of the probe 11a moves relative to a position facing the bit 1a to be detected, and in synchronization with the timing at which the detection target member 11 detects the polarization state of the bit 1a, the heating means 12 irradiates the bit with the near-field light 21d to heat the bit 1a to a predetermined temperature only while the detection target member 11 detects the polarization state of the bit 1a.

Figure 4:
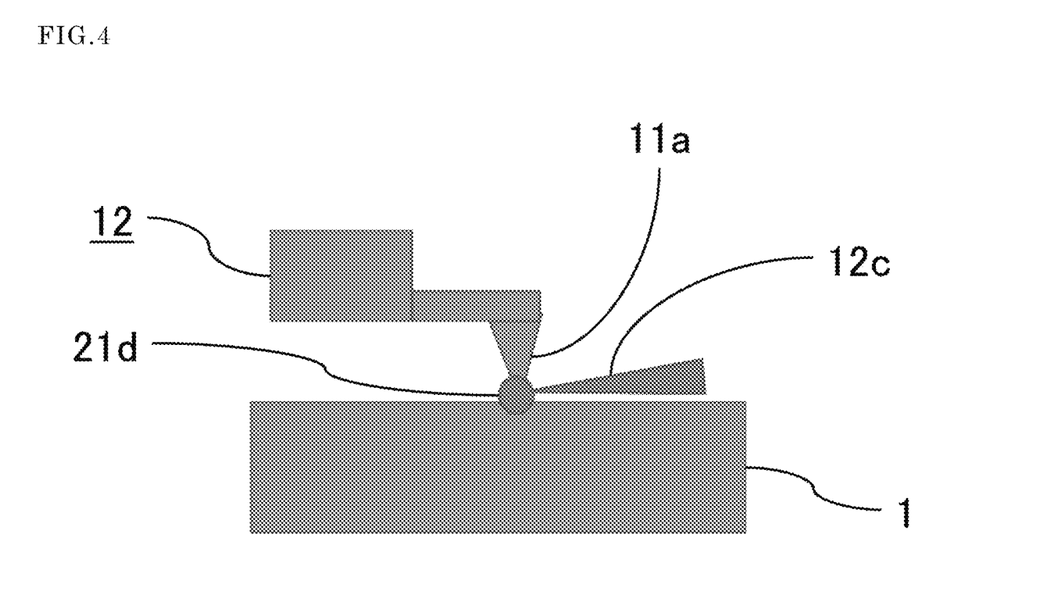
FIG. 4 is a side view showing an enlarged view of the probe area, showing a second modified example of a dielectric reproducing device according to an embodiment of the present invention that uses near-field light.

The heating means 12 may be configured using a near-field light generating device used in heat-assisted magnetic recording (HAMR). As shown in FIG. 4, the probe 11a is made of metal, and the heating means 12 may be configured to generate the near-field light 21d by irradiating the tip of the probe 11a with the focused laser beam 12c, and to heat the bit 1a to be detected to a predetermined temperature by the near-field light 21d.

As shown in FIGS. 1 to 3, the reproducing means 13 is configured to reproduce data recorded in the data recording layer 1 based on the polarization state of each bit 1a detected by the detection means 11. The reproducing means 13 has, for example, a means for demodulating the oscillation signal output by the oscillation means 11b and a means for recognizing the polarization direction of each bit 1a from the demodulated signal and reproducing the data. The AC voltage application means is provided to apply a known AC voltage to the data recording layer 1, and is configured to be able to determine the polarization direction of each bit 1a depending on whether the phase of the voltage is in phase or out of phase with the demodulated signal.

The detection means 11, the reproducing means 13, and the AC voltage application means of the dielectric reproducing device 10 may be any means capable of relatively scanning the data recording layer 1 to detect each bit 1a and reproducing data. In a specific example shown in FIG. 2, the detection means 11, the reproducing means 13, and the AC voltage application means are made up of devices utilizing the SNDM technology, such as the dielectric reproducing device described in Patent Literature 2.

Next, the operation will be described.

When the dielectric reproducing device 10 detects the polarization state of each bit 1a formed in the data recording layer 1 made of a dielectric material by allowing the detection means 11 to relatively scan the data recording layer 1, the heating means 12 can raise the temperature of the bit 1a to be detected by the detection means 11. This increases the nonlinear dielectric constant of the bit 1a to be detected, so that a reproduction signal with a high S/N ratio can be detected. If the S/N ratio of the reproduction signal is increased, the reproduction signal can be detected even if the relative scanning speed of the detection means 11 is increased, so that the reproduction speed of the data recorded in the data recording layer 1 can be improved.

The dielectric reproducing device 10 can improve the reproduction speed as the nonlinear dielectric constant of the bit 1a to be detected by the detection means 11 is increased, so that the temperature of the bit 1a should be lower than the Curie point of the dielectric material forming the data recording layer 1 and the closer to the Curie point, the better. Since the Curie point varies depending on the dielectric material, it is preferable to set the heating temperature of the heating means 12 according to the type of dielectric material forming the data recording layer 1. For example, it is preferable to heat the bit 1a to be detected using the heating means 12 to a temperature at least 100° C. below the Curie point of the dielectric material but lower than the Curie point. More specifically, it is preferable to heat to a temperature of 501° C. or higher and lower than 601° C. when CLT is used as the dielectric material, and a temperature of 585° C. or higher and lower than 685° C. when SLT is used.

Figure 5:
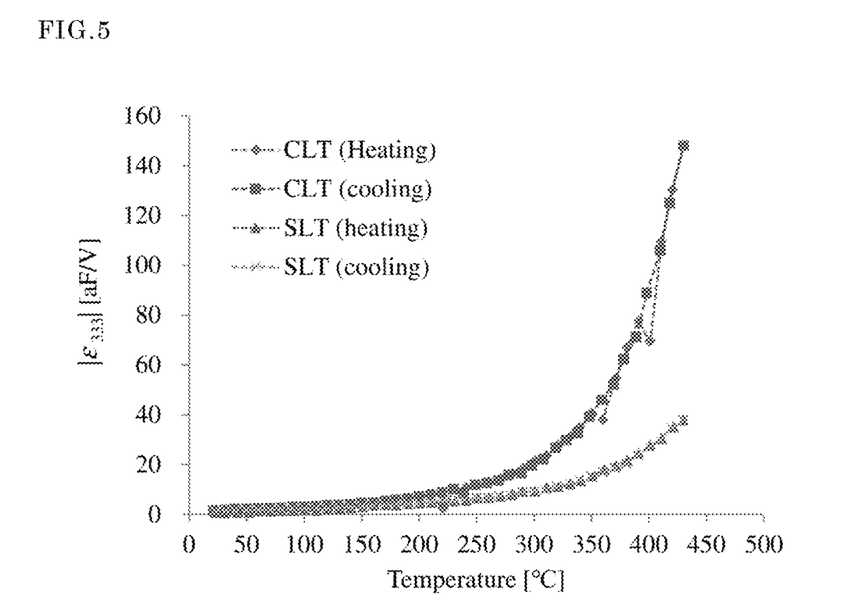
FIG. 5 is a graph showing the relationship between the nonlinear dielectric constant ($\varepsilon_{333}$) of CLT and SLT and temperature in a dielectric reproducing device according to an embodiment of the present invention.

Here, the results of an experiment to investigate the relationship between the nonlinear dielectric constant ($\varepsilon_{333}$) of CLT and SLT and temperature are shown in FIG. 5. FIG. 5 shows data (Heating) in which the nonlinear dielectric constant ($\varepsilon_{333}$) was measured while increasing the temperature, and data (Cooling) in which the nonlinear dielectric constant ($\varepsilon_{333}$) was measured while cooling. As shown in FIG. 5, when the temperature of each dielectric is increased, it can be confirmed that the nonlinear dielectric constant ($\varepsilon_{333}$) increases rapidly as the temperature approaches the Curie point. From FIG. 5, it can be seen that $\varepsilon_{333}$ is proportional to $(Tc-T)^{-3.5}$ (where Tc is the Curie temperature). Since $\varepsilon_{333}$ is proportional to the reproduction speed, for example, in the case of CLT, the reproduction speed at 501° C. is 472 times that at room temperature. In Non-Patent Literature 13, the reproduction speed at room temperature is 2 Mbps, so the reproduction speed at 501° C. at CLT is estimated to be about 945 Mbps.

As shown in FIG. 2, the dielectric reproducing device 10 uses the laser beam 12c focused by the lens 12b to heat each bit 1a. When heating a minute bit 1a of data recorded at high density on the data recording layer 1, the heat generated by the focused laser beam 12c may increase the temperature of not only the bit 1a to be detected, but also the surrounding bits 1a. However, since the bits are heated only for a short time to detect the polarization state, there is little effect on the thermal stability of those bits 1a. Therefore, the heating means 12 can be constructed with a simpler structure and at a lower cost than those that heat only the bit 1a to be detected.

As shown in FIGS. 3 and 4, when the near-field light 21d is used to heat each bit 1a, even if the bit 1a is a minute bit 1a of data recorded at high density on the data recording layer 1, the temperature of each bit 1a can be increased to detect a reproduction signal with a large S/N ratio. In addition, by using the near-field light 21d, only the bit 1a to be detected can be heated instantaneously. Therefore, the bit 1a to be detected is heated only while the detection means 11 detects the polarization state, and the temperature of the bit 1a can be reduced to the temperature before heating at the moment the detection is completed, thereby preventing a decrease in the thermal stability of the data recording layer 1.

In addition, the data recording layer 1 of the dielectric reproducing device 10 may be transparent to the laser beam 12c shown in FIG. 2 or the near-field light 21d shown in FIGS. 3 and 4, and may have a light absorbing layer on the side opposite to the side on which the detection means 11 scans relatively. In addition, the laser beam 12c shown in FIG. 2 or the near-field light 21d shown in FIGS. 3 and 4 may have a wavelength shorter than the absorption edge of the dielectric material. This allows the laser beam 12c or the near-field light 21d to be efficiently absorbed by the data recording layer 1 even without a light absorbing layer.

In addition, the dielectric reproducing device 10 may be incorporated in the dielectric recording and reproducing device as a reproducing device of the dielectric recording and reproducing device. The dielectric recording and reproducing device have, for example, a recording means configured to record data on the data recording layer 1, and is preferably configured to be capable of reproducing the data recorded by the recording means by the dielectric reproducing device 10. In this case, the recording means may be configured to apply a pulse voltage between the probe 11a of the dielectric reproducing device 10 and the lower electrode of the data recording layer 1 to record data on the data recording layer 1, or may be configured to record data at high density by other methods. The recording means is preferably capable of recording data on the data recording layer 1 at a high density of, for example, 1 Tb/inch$^2$ or more. In this way, it is possible to provide a dielectric recording and reproducing device for high density recording and highspeed reproduction.

Note that the dielectric reproducing device 10 is applicable to devices in which the physical quantity to be detected changes with temperature, devices in which the physical quantity to be detected has temperature dependency and increases as the temperature approaches the Curie point, and devices in which the physical quantity to be detected has temperature dependency and increases with temperature change.

Figure 6:
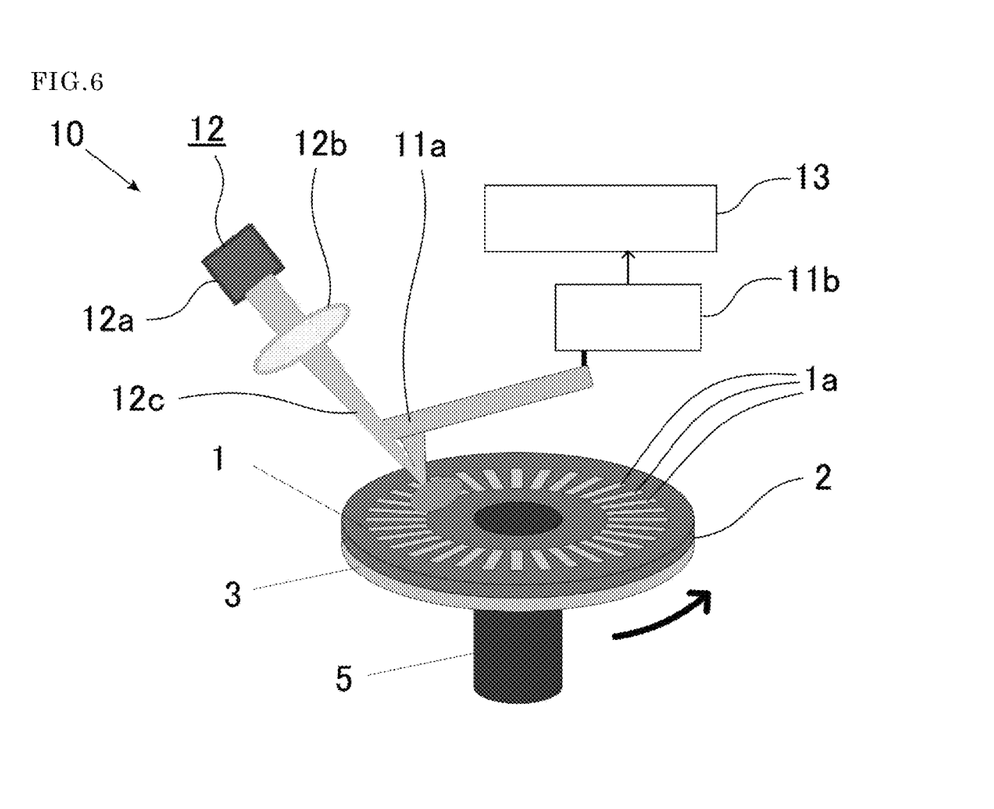
FIG. 6 is a perspective view showing a third modified example of a dielectric reproducing device according to an embodiment of the present invention that reproduces a disk-shaped data recording layer.

In addition, as shown in FIG. 6, the dielectric reproducing device 10 may be configured to reproduce data from a disk-shaped recording medium 2. The recording medium 2 has a disk-shaped data recording layer 1 provided on a disk-shaped lower electrode 3, and is provided to rotate around the central axis of the disk by a spindle motor 5. In the data recording layer 1, a plurality of bits 1a are regularly provided at a predetermined interval along the circumferential direction. The detection means 11 and the heating means 12 are fixed at least in the circumferential direction of the data recording layer 1, and are provided to scan the data recording layer 1 rotated by the spindle motor 5 relative to the data recording layer 1. The heating means 12 is provided to continuously emit the laser beam 12c.

In this case, the dielectric reproducing device 10 can sequentially heat each bit 1a provided in the circumferential direction of the data recording layer 1 by rotating the recording medium 2 by the spindle motor 5 and continuously emitting the laser beam 12c by the heating means 12 to heat the data recording layer 1, and can sequentially detect the polarization state of each bit 1*a* heated by the heating means 12 by the detection target member 11. In addition, also in this case, since the bit 1*a* to be detected and the surrounding bits 1*a* are heated only for a short time to detect the polarization state, there is little effect on the thermal stability of those bits 1*a*.

Example 1

Figure 7:
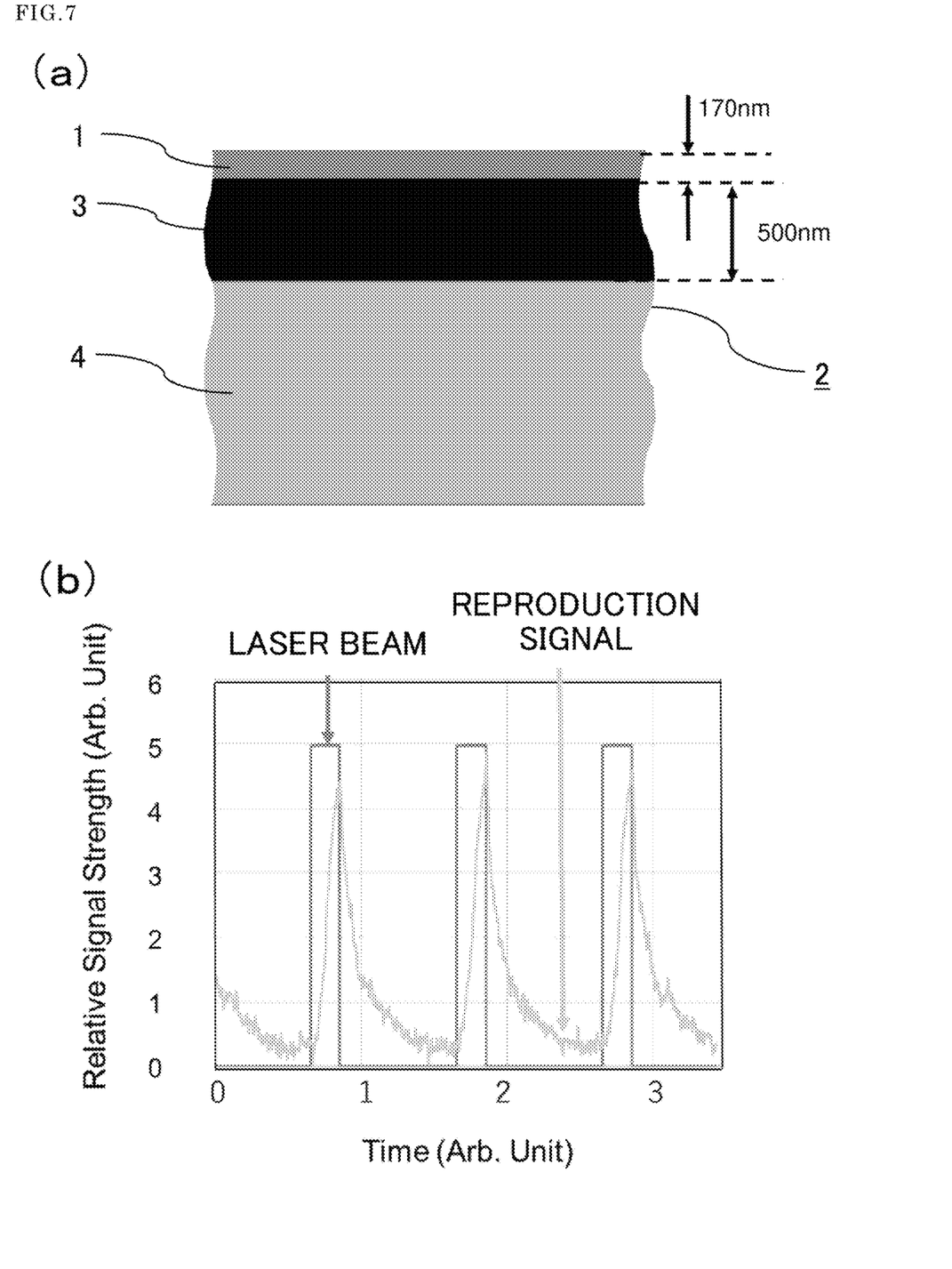
FIG. 7(a) is a cross-sectional view showing a recording medium used in a data reproduction experiment.
FIG. 7(b) is a graph showing the time change in the intensity (Relative Signal Strength) of the irradiated laser beam and the reproduced signal, showing the results of the data reproduction experiment, for a dielectric reproducing device according to an embodiment of the present invention.

An experiment was conducted to reproduce (read) data from the data recording layer 1 using the dielectric reproducing device 10 shown in FIG. 2. The recording medium 2 used in the experiment is shown in FIG. 7(*a*). As shown in FIG. 7(*a*), the recording medium 2 is composed of a data recording layer 1, a lower electrode 3, and a substrate 4. In the recording medium 2, the lower electrode 3 is provided on the substrate 4, and the data recording layer 1 is provided on the lower electrode 3. The data recording layer 1 is made of CLT and has a thickness of 170 nm. The lower electrode 3 is an electrode for applying an AC voltage to the data recording layer 1, and is made of chromium and has a thickness of 500 nm.

In the experiment, the surface of the data recording layer 1 was heated by irradiation with a laser beam 12*c* emitted from the emission means 12*a* and focused by the lens 12*b* at a predetermined period. In addition, the signal at the irradiation position was continuously detected by the detection means 11. FIG. 7(*b*) shows the time change of the intensity (Relative Signal Strength) of the irradiated laser beam 12*c* and the reproduction signal (detection signal). As shown in FIG. 7(*b*), it was confirmed that the intensity of the reproduction signal increases rapidly when the laser beam 12*c* is irradiated, and decreases rapidly when the irradiation of the laser beam 12*c* is stopped. From this, it can be said that it is possible to detect a reproduction signal with a large S/N ratio by increasing the temperature of the position (bit 1*a*) of the data recording layer 1 to be detected. It can also be said that this can improve the reproduction speed of the data recorded in the data recording layer 1.

[Evaluation of Instability of Bits of Data Recording Layer Due to Light Irradiation]

As shown in Non-Patent Literature 15, from the fact that domain dots shrink when a dielectric material is heat-treated, the instability of the bits 1*a* of the data recording layer 1 when heated by periodic irradiation with laser lights or the like was evaluated. From the empirical formula showing the relationship between the reduction rate of the domain dot diameter, temperature, and heating time obtained in Non-Patent Literature 15, when the data recording layer 1 is made of CLT and its thickness is 80 nm, the number of times n that laser beams or the like can be periodically irradiated when the reduction rate ($r_{final}/r_0$) is determined is expressed by the following formula (1).

[Math. 1]

$$n = \frac{\log(r_{final}/r_0)}{-0.5\exp(\log\alpha - E_a/kT + \log t_1)} \quad (1)$$

Here, $\alpha = 2.21 \times 10^5$, $E_a = 1.22 \times 10^{-19}$ (J), k: Boltzmann constant, T: absolute temperature, $t_1$: heating time (h), $r_{final}$: final radius of the bit, and $r_0$: initial radius of the bit. Note that the heating time $t_1$ is the pulse width of the laser beams or the like.

Figure 8:
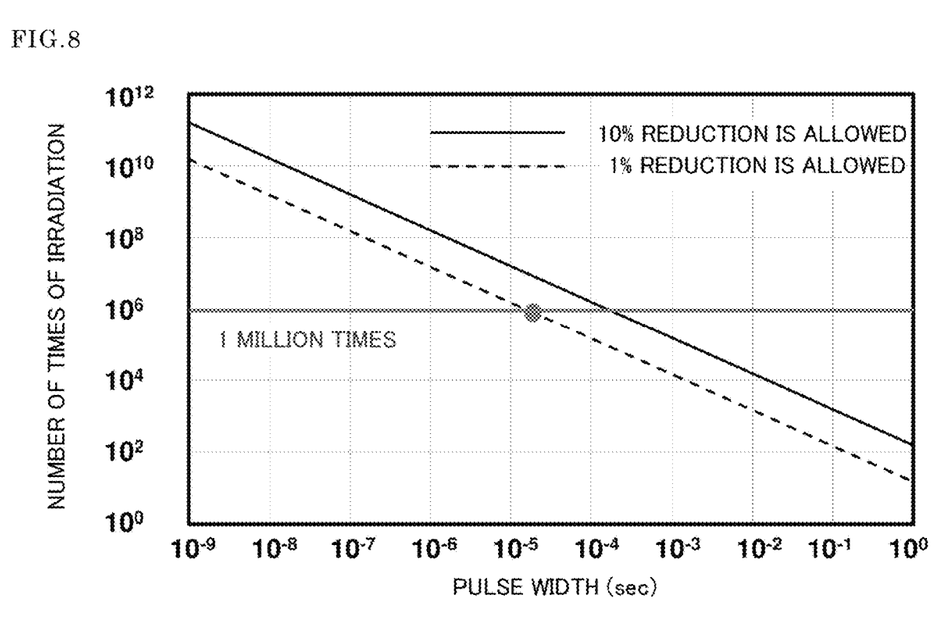
FIG. 8 is a graph showing the relationship between the number of times of irradiation of laser beams and the pulse width when the bit reduction rate is allowed to be 1% and 10% in the dielectric reproducing device of the embodiment of the present invention.

When the data recording layer 1 is made of CLT and its thickness is 80 nm, the relationship between the number of times n of irradiation of laser beams or the like and the pulse width $t_1$ when the heating temperature T is 550° C. is obtained from formula (1) and is shown in FIG. 8. FIG. 8 shows the results when the bit reduction rate ($r_{final}/r_0$) is allowed to be 1% (dashed line) and 10% (solid line). Referring to FIG. 5, T=550° C. corresponds to a reproduction speed equivalent to 4.99 Gbps.

As shown in FIG. 8, if up to 1 million times of irradiation is possible, and 1% reduction is allowed, the pulse width should be about $10^{-5}$ sec (10 μsec) or less. In addition, when reproducing data with a recording density of 4 Tb/inch² (bit interval of 12.8 nm) at 1 Gbps, the one-dimensional spread (in the forward direction of reading data) of the laser beam and the like when irradiating only one recording track should be 128 μm or less. From this result, it can be said that the light irradiated for heating does not necessarily have to be near-field light, and it may be a focused laser beam.

Figure 9:
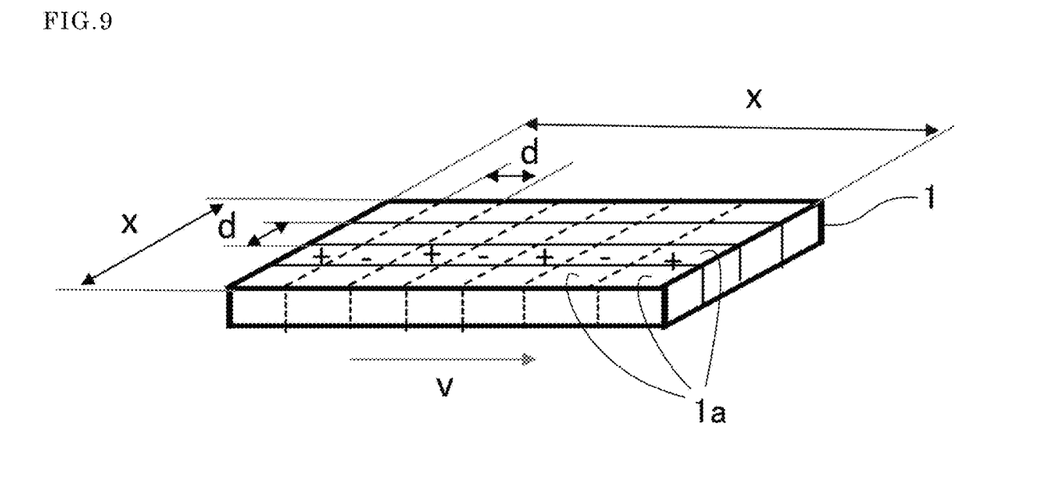
FIG. 9 is a perspective view showing a laser beam irradiation area when the laser beam of the heating means spreads not only to the bit to be detected but also to surrounding bits in the dielectric reproducing device of the embodiment of the present invention.

Next, as shown in FIG. 6, an evaluation was performed for a case where the laser beam is continuous light, and it spreads not only to the bit 1*a* to be detected but also to the surrounding bits 1*a*. For simplicity, it is assumed that as shown in FIG. 9, the irradiation area of the laser beam is a square with one side x, and the size of each bit 1*a* is a square with one side d (d<x). In addition, it is assumed that the data recording layer 1 moves one-dimensionally at a speed v along the direction of one side of each bit 1*a*.

If the number of times of possible irradiation when only one bit 1*a* is heated is y, the reading speed by the detection means 11 is s (bps), and the time during which one bit 1*a* is irradiated with a laser beam (the same as the laser pulse width when a stationary data recording layer 1 is irradiated with a laser pulse) is $t_1$ (sec), the number of bits 1*a* simultaneously irradiated with the laser beam is x/d, and further, $x = d \cdot s \cdot t_1$. If the number of times the laser beam can be irradiated at this time is Z, then $Z = y/(x/d) = y/(s \cdot t_1)$, and Z does not depend on the length d of one side of each bit.

Here, taking the case where 10% reduction is allowed as shown in FIG. 8 as a reference, if s=1 Gbps, $t_1$=1 μsec, and $y = 10^8$, then the number of times Z the laser beam can be irradiated is $Z = 10^8/10^9/10^{-6} = 10^5$, and 100,000 rewrites are possible. This is the same number of rewrites as a commercially available flash memory. In addition, if the recording density is 4 Tb/inch² (d=12.8 nm), the irradiation area of the laser beam at this time is $x = d \cdot s \cdot t_1 = 12.8 \times 10^{-9} \cdot 10^9 \cdot 10^{-6} = 12.8$ μm. From this result, it can be said that the light irradiated for heating does not necessarily have to be near-field light, and it can also be a focused laser beam.

REFERENCE SIGNS LIST

1: Data recording layer
1*a*: Bit
10: Dielectric reproduction device
11: Detection means
11*a*: Probe
11*b*: Oscillation means
12: Heating means
12*a*: Emission means
12*b*: Lens
12*c*: Focused laser beam
13: Reproduction means
21*a*: Laser diode
21*b*: Near-field light generating device
21*c*: Optical waveguide
21*d*: Near-field light 2: Recording medium
3: Lower electrode
4: Substrate
5: Spindle motor

The invention claimed is:

1. A dielectric reproducing device for reproducing data recorded on a data recording layer made of a dielectric material,
the data recording layer being capable of recording data based on a polarization state of each bit formed on the dielectric material, the dielectric reproducing device comprising:
a detection means provided to be able to detect a nonlinear dielectric constant due to the polarization state of each bit corresponding to the data by relatively scanning the data recording layer;
a heating means provided to be able to heat the bit to be detected to a predetermined temperature while the detection means detects the nonlinear dielectric constant due to the polarization state; and
a reproducing means provided to be able to reproduce the data based on the nonlinear dielectric constant due to the polarization state of each bit detected by the detection means.

2. The dielectric reproducing device according to claim 1, wherein the heating means is configured to heat the bit in synchronization with a timing at which the detection means detects the nonlinear dielectric constant due to the polarization state of the bit to be detected.

3. The dielectric reproducing device according to claim 2, wherein the heating means has an emission means for emitting a laser beam and a lens for focusing the laser beam emitted from the emission means, and is configured to heat the bit to be detected by irradiation with the laser beam focused by the lens.

4. The dielectric reproducing device according to claim 3, further comprising a light absorbing layer provided on a side of the data recording layer opposite to a side on which the detection means scans relatively, wherein
the data recording layer is transparent to the laser beam.

5. The dielectric reproducing device according to claim 3, wherein the laser beam has a wavelength shorter than an absorption edge of the dielectric material.

6. The dielectric reproducing device according to claim 2, wherein
the detection means has a probe provided so as to be capable of relatively scanning the data recording layer, and is configured to detect the polarization state of the bit to be detected when a tip of the probe moves relatively to a position facing the bit, and
the heating means is capable of generating near-field light, is provided near the probe so as to be movable together with the probe, and is configured to be able to heat the bit to be detected by the near-field light.

7. The dielectric reproducing device according to claim 6, further comprising a light absorbing layer provided on the side of the data recording layer opposite to the side on which the detection means is relatively scanned, wherein
the data recording layer is transparent to the near-field light.

8. The dielectric reproducing device according to claim 6, wherein the near-field light has a wavelength shorter than an absorption edge of the dielectric material.

9. The dielectric reproducing device according to claim 2, wherein
the detection means has a metal probe provided so as to be capable of relatively scanning the data recording layer, and is configured to detect the nonlinear dielectric constant due to the polarization state of the bit to be detected when a tip of the probe moves relatively to a position facing the bit, and
the heating means is provided so as to be capable of generating near-field light by irradiating the tip of the probe with a laser beam, and is configured to be able to heat the bit to be detected by the near-field light.

10. The dielectric reproducing device according to claim 2, wherein the dielectric material is a ferroelectric material.

11. A dielectric recording and reproducing device, comprising:
the dielectric reproducing device according to claim 2; and
a recording means configured to record data on the data recording layer, wherein
the dielectric reproducing device is capable of reproducing the data recorded by the recording means.

12. The dielectric reproducing device according to claim 1, wherein the heating means has an emission means for emitting a laser beam and a lens for focusing the laser beam emitted from the emission means, and is configured to heat the bit to be detected by irradiation with the laser beam focused by the lens.

13. The dielectric reproducing device according to claim 12, further comprising a light absorbing layer provided on a side of the data recording layer opposite to a side on which the detection means scans relatively, wherein
the data recording layer is transparent to the laser beam.

14. The dielectric reproducing device according to claim 12, wherein the laser beam has a wavelength shorter than an absorption edge of the dielectric material.

15. The dielectric reproducing device according to claim 1, wherein
the detection means has a probe provided so as to be capable of relatively scanning the data recording layer, and is configured to detect the polarization state of the bit to be detected when a tip of the probe moves relatively to a position facing the bit, and
the heating means is capable of generating near-field light, is provided near the probe so as to be movable together with the probe, and is configured to be able to heat the bit to be detected by the near-field light.

16. The dielectric reproducing device according to claim 15, further comprising a light absorbing layer provided on the side of the data recording layer opposite to the side on which the detection means is relatively scanned, wherein
the data recording layer is transparent to the near-field light.

17. The dielectric reproducing device according to claim 15, wherein the near-field light has a wavelength shorter than an absorption edge of the dielectric material.

18. The dielectric reproducing device according to claim 1, wherein
the detection means has a metal probe provided so as to be capable of relatively scanning the data recording layer, and is configured to detect the nonlinear dielectric constant due to the polarization state of the bit to be detected when a tip of the probe moves relatively to a position facing the bit, and
the heating means is provided so as to be capable of generating near-field light by irradiating the tip of the probe with a laser beam, and is configured to be able to heat the bit to be detected by the near-field light.

19. The dielectric reproducing device according to claim 1, wherein the dielectric material is a ferroelectric material.

20. A dielectric recording and reproducing device, comprising:
- the dielectric reproducing device according to claim 1; and
- a recording means configured to record data on the data recording layer, wherein
- the dielectric reproducing device is capable of reproducing the data recorded by the recording means.

* * * * *